United States Patent [19]
Dorner

[11] Patent Number: 5,962,832
[45] Date of Patent: Oct. 5, 1999

[54] APPARATUS FOR PERSONALIZING IDENTIFICATION CARDS

[75] Inventor: Frank Dorner, Vienna, Austria

[73] Assignee: Kunz GmbH, Vienna, Austria

[21] Appl. No.: 08/956,526

[22] Filed: Oct. 23, 1997

[30] Foreign Application Priority Data

Oct. 24, 1996 [DE] Germany .............. 196 44 306

[51] Int. Cl.$^6$ .................................................. G06K 13/07
[52] U.S. Cl. .................... 235/380; 235/441; 235/449;
235/480; 400/188; 347/218; 101/230
[58] Field of Search .................................. 235/380, 381,
235/441, 449, 475, 480, 492; 400/188,
120.01; 347/218; 101/230

[56] References Cited

U.S. PATENT DOCUMENTS 5,326,179  7/1994  Fukai et al. .............................. 400/120
5,600,362  2/1997  Morgavi et al. ......................... 347/218
5,709,484  1/1998  Dorner ..................................... 480/188
5,768,143  6/1998  Fujimoto et al. ....................... 235/380

FOREIGN PATENT DOCUMENTS 0 153 693   9/1985  European Pat. Off. .
0 597 135 A1  5/1994  European Pat. Off. .

Primary Examiner—F. L. Evans
Attorney, Agent, or Firm—Flynn, Thierl, Boutell & Tanis, P.C.

[57] ABSTRACT

An apparatus for personalizing identification cards with integrated circuits includes at least one printing unit and a reversing unit for reversing and transporting the printed identification card. The reversing unit has a rotor, at least one card transport device fastened thereto and a contacting device for loading the integrated circuits onto the cards.

7 Claims, 4 Drawing Sheets

APPARATUS FOR PERSONALIZING IDENTIFICATION CARDS

FIELD OF THE INVENTION

An apparatus for personalizing identification cards This invention relates to an apparatus for personalizing identification cards.

BACKGROUND OF THE INVENTION

An apparatus for personalizing identification cards is known. It is used for issuing printed identification cards with integrated circuits according to ISO 7816-2, i.e. so-called chip cards. With one printing unit the front of the card is printed, the card is reversed in the reversing unit, and then e.g. with a second printing unit, the back of the card is printed or in an embossing unit alphanumeric data are embossed into the card so as to be raised therefrom. The contacting device for loading the chip of the card follows the reversing unit.

According to EP 0153693 B1 the printing unit can have a thermal printhead consisting of a row of heating elements extending perpendicular to the card transport direction, the elements being singly drivable with an EDP machine and having a density of for example 100 heating elements per cm. The thermal printhead can write in two coordinates, one coordinate extending in the card transport direction and the other perpendicular thereto. The transport of the card is controlled and clocked with a stepping motor which moves the card past the row of heating elements in steps corresponding to the density of the heating elements. For printing plastic or plastic-coated identification cards, an ink transfer foil is provided which is moved through between card and thermal printhead and pressed by a counterpressure roll both against the heating elements and against the card. The ink transfer foil has an ink transfer layer with a thermoactive adhesive so that it sticks to the plastic card surface when heated by the heating elements. For this purpose the thermoactive adhesive must begin to melt the plastic surface of the card. Accordingly, the cards are preferably made of a plastic which softens on the surface at the temperature the ink transfer foil reaches when heated by the heating elements, in particular polyvinyl chloride, ABS or polypropylene.

While printing or embossing the card only takes a few seconds, the loading of the chips is more time-consuming and can be many times longer than printing or embossing if a relatively large amount of information is to be transferred. The time for loading the chips therefore has an essential influence on the speed of the known personalizing apparatus.

EP 0 597 135 A1 discloses an apparatus for reading and inscribing magnetic cards with a printing unit which can also read contact-bearing chip cards. The chip cards are supplied from a card shaft in a rotatable receiving drum to a chip reading unit in a channel in the housing of the apparatus. The receiving drum can also be used for reversing a chip card if the latter is not inserted with the side facing the chip contacts. However, the receiving drum otherwise serves as a kind of switch for putting the cards into the individual channels in the housing.

The problem of the invention is to substantially increase the speed of the known chip card personalizing apparatus in a simple way.

SUMMARY OF THE INVENTION

The apparatus of the invention for personalizing identification cards processes cards at an increased speed. The inventive apparatus is not only suitable for personalizing apparatuses having one printing unit before, and one printing unit or other card processing unit after, the reversing unit. It is intended in particular for an apparatus for printing chip cards on both sides with only one printing unit. This printing unit has a thermal printhead, a card transport device for moving the card past the thermal printhead in steps, an entry sensor on its side facing away from the reversing unit for switching on the card transport device upon supply of a card, and an exit sensor for switching off the card transport device. The card transport device of the reversing unit is controlled such that, after supply of the card printed on one side and rotation of the rotor by 180° C., it supplies the reversed card printed on one side to the printing unit again. The card transport apparatus of the printing unit is switchable from the forward to the return transport direction for transporting the card from the exit sensor back to the entry sensor. Upon supply of the reversed card, the exit sensor switches on the card transport device of the printing unit switched over to the return transport direction. After supply of the card to the entry sensor, the card transport device is switched back to the forward transport direction for printing of the other side and for repeated supply to the reversing unit.

Identification cards include here both ID cards, i.e. cards permitting identification of their owners or identifying them as members of a group, and key cards, i.e. cards permitting the owners to utilize certain services.

The card transport device on the rotor can be formed by pairs of rolls disposed in the card transport direction at a distance smaller than the length of the card. Instead of the pairs of rolls, one can also provide a circulating transport band with counterpressure rolls or a pair of transport bands.

The rotor can have only one card transport device extending in the radial direction, or a plurality of, in particular two, card transport devices whose card transport directions cross. In this case the rolls or transport bands must be disposed so that the middle area where the transport directions cross remains free.

BRIEF DESCRIPTION OF THE DRAWINGS

In the following, various embodiments of the inventive apparatus will be explained by way of example with reference to the schematic drawing, in which.

DETAILED DESCRIPTION OF THE INVENTION

Figure 1:
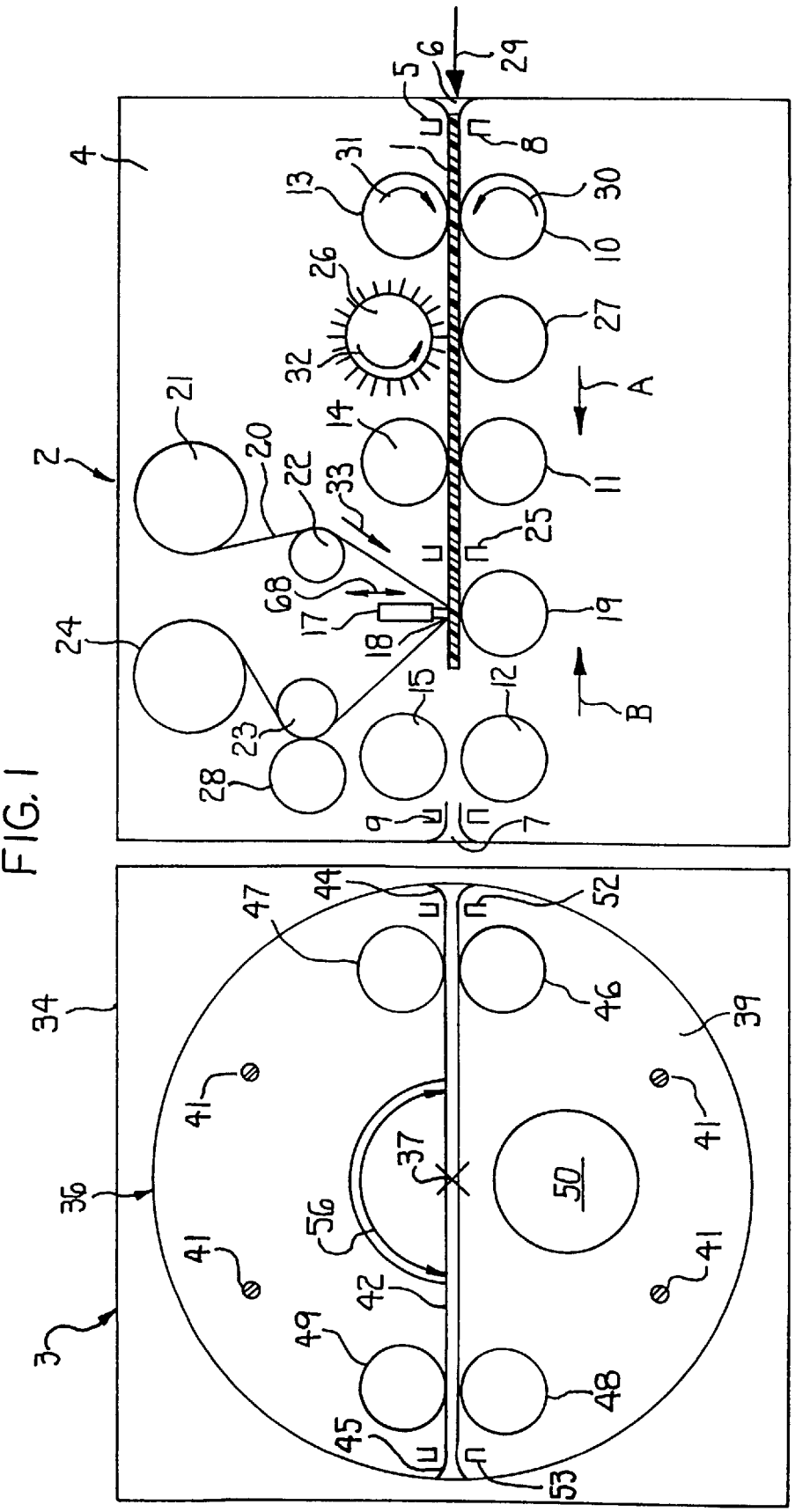
FIG. 1 shows a longitudinal section through the printing unit and reversing unit of the chip card personalizing apparatus, the card to be personalized being disposed in the printing unit.

According to FIG. 1, the apparatus for personalizing plastic identification card 1 consists of printing unit 2 and directly following reversing unit 3.

Printing unit 2 has a housing with two side walls, FIG. 1 showing only back side wall 4.

At the entry and exit ends the side walls are provided with guides 5 widening out in the form of funnels 6, 7 for introduction of the longitudinal edges of card 1. The two side plates then perform the lateral guidance on both sides of card 1. Sensors 8, 9 are provided at the entry and exit ends, respectively.

The device for transporting card 1 has three rolls 10, 11, 12 on one, lower side of card 1 and three rolls 13, 14, 15 on the other, upper side of card 1. Rolls 10, 11, 12 are driven via a toothed wheel gear (not shown) by a stepping motor (not shown) and form with rolls 13, 14, 15, which are not driven, pairs of rolls between which card 1 is guided to be moved in the direction of arrow A from entry sensor 8 to exit sensor 9 (forward transport direction). The distance between pairs of rolls 10, 13 and 11, 14, and 11, 14 and 12, 15, is such that card 1 is always grasped by at least one pair of rolls.

Between the two pairs of rolls 11, 14 and 12, 15 thermal printhead 17 is disposed on one, upper side of card 1. Thermal printhead 17 is formed as an upright plate and has heating elements 18 on its edge facing card 1. Heating elements 18 form a row extending perpendicular to transport direction A. Heating elements 18 are drivable singly with an EDP machine (not shown).

On the side of card 1 opposite thermal printhead 17 there is nondriven counterpressure roll 19.

For printing, thermal transfer foil 20 is provided. Unwound from supply roller 21, it is supplied via deflection roller 22 around the lower edge of thermal printhead 17 with heating elements 18 and then via deflection roller 23 to take-up roller 24, which is driven by a motor (not shown) to keep foil 20 tight on the side of thermal printhead 17 facing take-up roller 24.

Card 1 is pressed by counterpressure roll 19 against heating elements 18 of thermal printhead 17 through the intermediary of thermal transfer foil 20.

Heating elements 18 are disposed on thermal printhead 17, for example at a distance of about 0.008 mm from mid heating element to mid heating element. The stepping motor then rotates rolls 10, 11, 12 for example, such that card 1 is likewise transported in steps of about 0.008 mm in the direction of arrow A. Per step, one cross row of ink dots can be transferred from thermal transfer foil 20 to the card surface by singly drivable heating elements 18. The dwell time for ink transfer between the transport steps is in general between 0.2 and 2 ms, i.e. for example 0.5 ms.

On the side facing entry sensor 8 further sensor 25 is disposed before thermal printhead 17. Sensors 8, 9 and 25 are preferably each formed from two light barriers disposed on one and the other side of the card.

Further, brush roll 26 driven by the stepping motor via the toothed wheel gear is disposed between the two pairs of rolls 10, 13 and 11, 14. During transport of card 1 brush roll 26 rotates in the direction of arrow 32 in the opposite direction to rolls 10, 11 and 12, cooperating with nondriven mating roll 27. To remove particles and similar dirt from the card surface, another roll (not shown) with an adhesive surface to which the dirt particles stick can be provided along with brush roll 26.

To perform a color print with color foil 20 having sections of ink transfer material in the basic colors, magenta, cyan, yellow and black, running wheel 28 is provided for measuring the length of transported foil 20 and thus determining exactly the position of the individual sections.

When card 1 is supplied for printing to entry 29, light barrier 8 switches on the stepping motor so that rolls 10, 11, 12 rotate with their mating rolls 13, 14, 15 in accordance with arrows 30, 31.

Brush roll 26 rotates in the opposite direction according to arrow 32.

The card is thus transported from entry sensor 8 to thermal printhead 17. It draws thermal transfer foil 20 through in the direction of arrow 33 under thermal printhead 17. Foil 20 is thereby transported by card 1. Take-up roller 24 driven by a motor serves only to prevent belt slack on the side of thermal printhead 17 facing take-up roller 24.

Sensor 25, before thermal printhead 17, is used for positioning as exactly as possible the place on card 1 as of which thermal printhead 17 prints the card.

When card 1 leaves printing unit 2, sensor 9 at the exit switches off the stepping motor.

Figure 2:
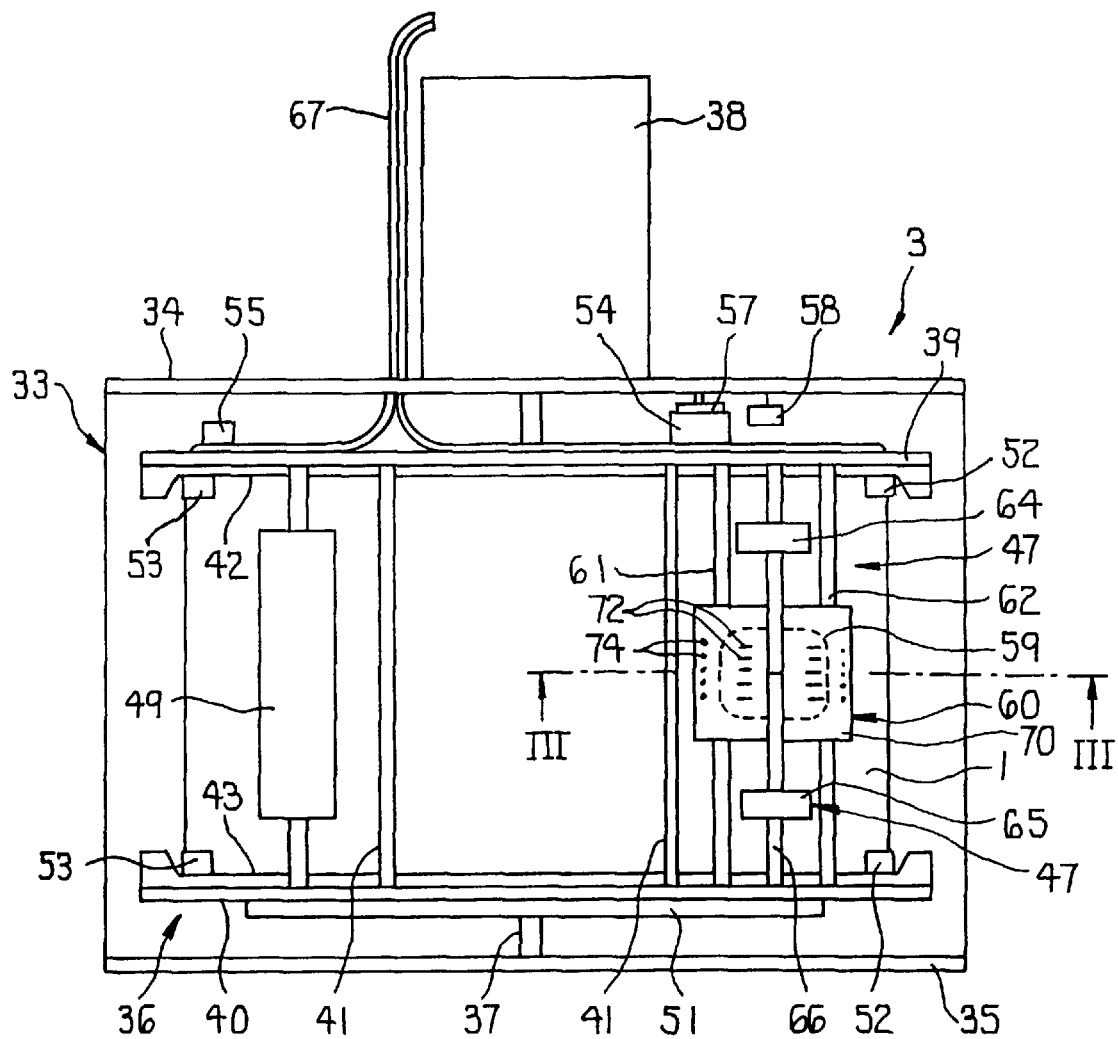
FIG. 2 shows a plan view of the reversing unit according to FIG. 1 but with the card in the reversing unit.

Reversing unit 3 consists according to FIGS. 1 and 2 of housing 33 with two side walls 34, 35 between which rotor 36 is pivoted with shaft 37 extending perpendicular to transport direction A and driven by reversing motor 38.

Rotor 36 consists of two disk-shaped side walls 39, 40 interconnected by a plurality of struts 41.

Both side walls 39, 40 of rotor 36 have groove-shaped guides 42, 43 for card 1 which are provided on the entry and exit sides with funnel-shaped flares 44, 45 for introduction of card 1 into guides 42, 43 from one and the other side.

For transport of card 1 within reversing unit 3, pairs of rolls 46, 47 and 48, 49 are provided on rotor 36 on guides 42, 43 on one and the other side, respectively, which are driven via toothed wheel gear 51 (shown schematically in FIG. 2) by motor 50 fastened to rotor 36.

Both rolls 46 and 47; 48 and 49 of each pair are preferably driven so that the weight of card 1 cannot change the transport speed upon reversal of the card.

Pair of rolls 46, 47 take up card 1 when the card leaves printing unit 2 via exit sensor 9 after being printed on the upper side by thermal printhead 17.

On both sides of the card transport device of reversing unit 3, sensors 52, 53 are fastened to rotor 36. As seen in FIG. 2, each sensor 52, 53 consists of two light barriers on one and the other longitudinal side of card 1. Each light barrier is in turn composed of a light source on one side of card 1 and a photocell on the other side of card 1.

Rotor 36 is rotatable with reversing motor 38 in accordance with double arrow 56 in FIG. 1 by 180° in one or the other direction. Stops (not shown) are provided for limiting travel to 180° between the rotary positions.

On wall 39 of rotor 36 there are two noses 54, 55 which cooperate with two light barriers 57, 58 fastened to side wall 34 of housing 33.

When card 1 is supplied from printing unit 2 to sensor 52 of reversing unit 3, this sensor switches on transport motor 50 so that transport rolls 46, 47 transport card 1 until it reaches sensor 53 at the other end of rotor 36. Sensor 53 then switches transport motor 50 off and reversing motor 38 on, so that rotor 36 is rotated by 180°. The rotary position of rotor 36, i.e. whether sensor 52 or sensor 53 faces printing unit 2, is detected by sensors 57, 58 which cooperate as light barriers with noses 54, 55.

Figure 3:
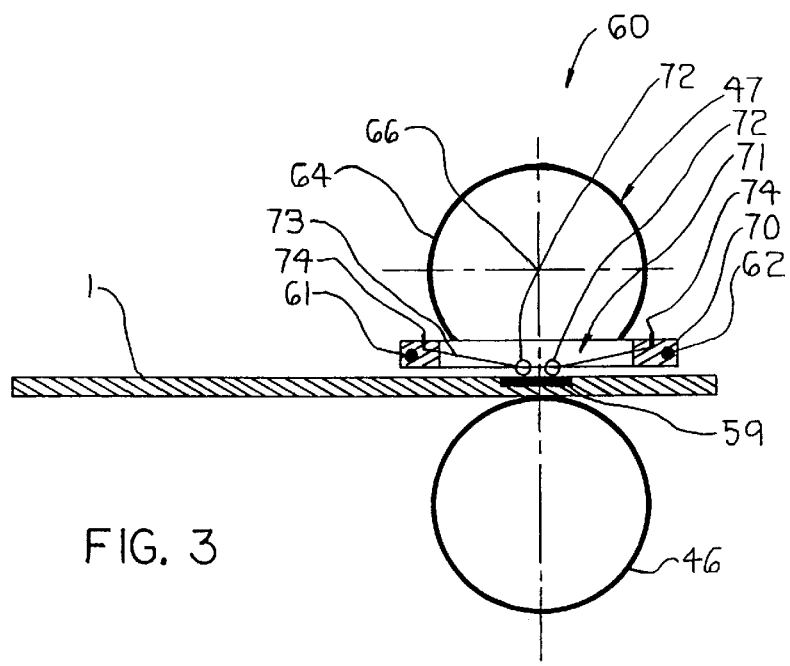
FIG. 3 shows a section along line III—III in FIG. 2 but enlarged over FIG. 2.

According to FIG. 3, identification card 1 has a chip, i.e. encodable microcircuit 59, shown by the dashed line in FIG. 2. The invention permits chip cards 1 to be loaded in reversing unit 3 while the next card 1 is being printed in printing unit 2. Rotor 36 of reversing unit 3 is provided with contacting device 60 for loading chips 59 of cards 1.

According to FIGS. 2 and 3, contacting device 60 consists of plate 70, for example made of plastic, in which chip contacts are located in slots 71 extending in the card transport direction. The chip contacts each have contact wheels 72 with a rotation axis extending perpendicular to the transport direction which are fastened rotatably to arms 73 spring-loaded toward card 1. The ends of said arms facing away from wheels 72 extend through the massive edge area of plastic plate 70 to contact 74 to which an EDP machine (not shown) is connected which drives contacting device 60.

So that enough room is available for chip contacting device 60 in the area of chip 59, transport roll 47 according to FIG. 2 is formed on axle 66 by two disk-shaped rollers 64 and 65, as indicated by FIGS. 2 and 3.

Power is supplied to the electric devices on rotor 36, i.e. to motor 50, sensors 52, 53 and coding device 60, through a bundle of cables 67 which rotates with rotor 36.

When card 1 has been printed on one side by thermal printhead 17 of printing unit 2 according to FIG. 1, its chip 59 is loaded by chip contacting device 60 on rotor 36 of reversing unit 3. After the card has been reversed with reversing unit 3, it is supplied to printing unit 2 again in order to be printed on the other side. For this purpose, transport motor 50 is not switched over after reversal of card 1, so that the card is supplied to exit sensor 9 of printing unit 2 without a change of direction of rotation of transport rolls 46 to 49, thereby moving past printhead 17 to entry sensor 8 in accordance with arrow B in FIG. 1. That is, exit sensor 7 switches on the stepping motor in the opposite direction of rotation and when card 1 printed on one side and moved in the return transport direction according to arrow B has reached entry sensor 8, the latter switches the stepping motor to the other direction of rotation so that the transport device supplies card 1 to thermal printhead 17 again in the forward transport direction according to arrow A for the other side of the card to be printed.

To prevent the card from touching thermal transfer foil 20 during return transport from exit sensor 9 to entry sensor 8, thermal printhead 17 is adapted to be moved up and down according to arrow 68, i.e. it is raised during return transport of the card.

After card 1 has been printed on both sides it is supplied to reversing unit 3 again. It can then be outputted from reversing unit 3 reversed or unreversed on the side of reversing unit 3 facing away from printing unit 2.

Figure 4:
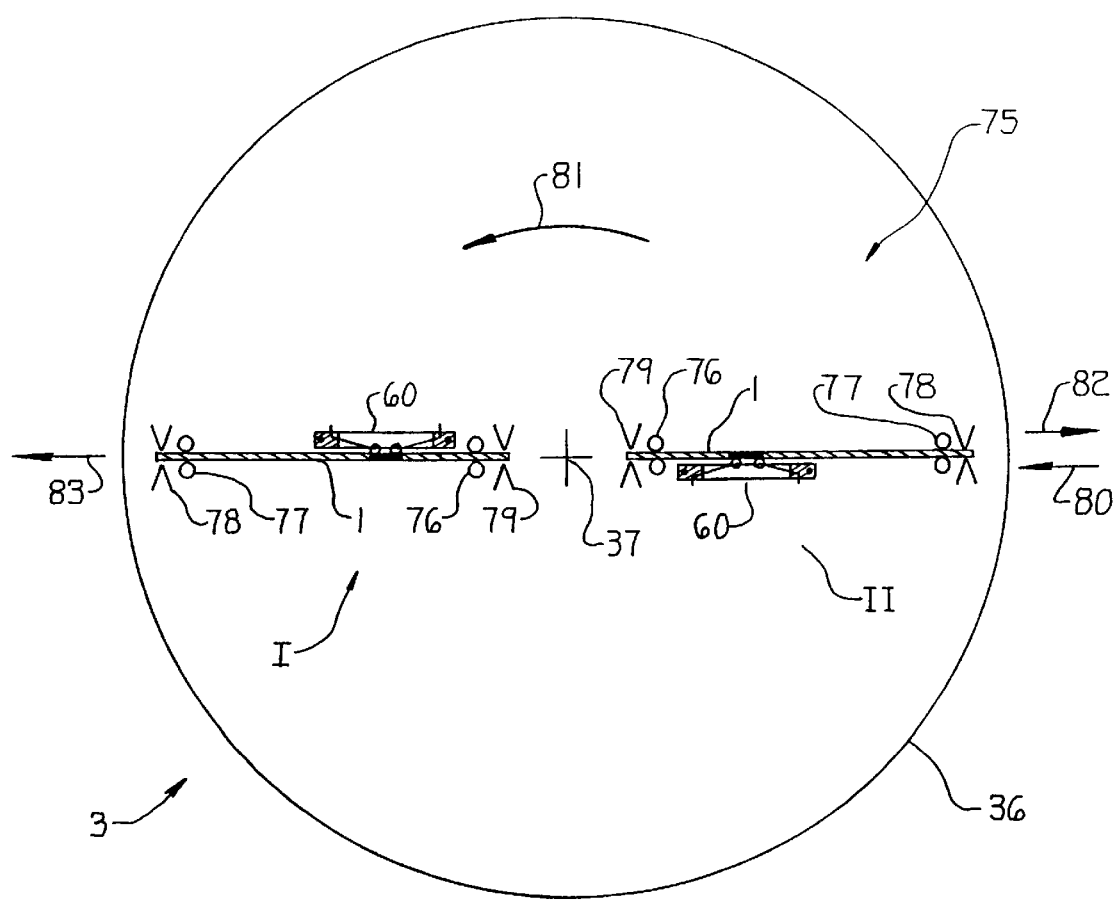
FIG. 4 shows a highly schematic view of a reversing unit with a rotor with two chip contacting devices.

In the embodiment according to FIG. 4, rotor 36 of reversing unit 3 has card transport device 75 which extends radially to rotation axis 37 of rotor 36, as with the reversing unit according to FIGS. 1 to 3.

However, card transport device 75 according to FIG. 4 consists of two portions I and II on one and the other side of rotation axis 37, respectively.

Each portion I and II has two pairs of rolls 76, 77. The mutual distance of all pairs of rolls 76, 77 of card transport device 75 is smaller than the length of chip cards 1. On each portion I, II there is chip contacting device 60, further at both ends of each portion I and II sensor 78, 79, for example in the form of a light barrier, for detecting the presence or absence of card 1 and then controlling the rotation of rotor 36 and chip contacting devices 60.

When first card 1 is supplied to reversing unit 3 according to FIG. 4 according to arrow 80 after its front has been printed by printing unit 2, it is transported with pairs of rolls 76, 77 over portion II to portion I of card transport device 75 where chip 59 of card 1 is loaded by chip contacting device 60 of portion I. Next, second card 1, which is printed on both sides and whose chip 59 is already loaded in part, is transported from printing unit 2 according to arrow 80, to portion II without rotor 36 being rotated. Then rotor 36 is rotated by 180° according to arrow 81, chip 59 of card 1 being loaded partly in portion I and chip 59 of card 1 loaded completely in portion II. Then card 1 printed on both sides with completely loaded chip 59 in portion II is supplied according to arrow 83 to the processing unit of the card personalizing device following reversing unit 3, and card 1 printed on the front with partly loaded chip 59 in portion I is supplied according to arrow 82 to printing unit 2 to be printed on its back.

Figure 5:
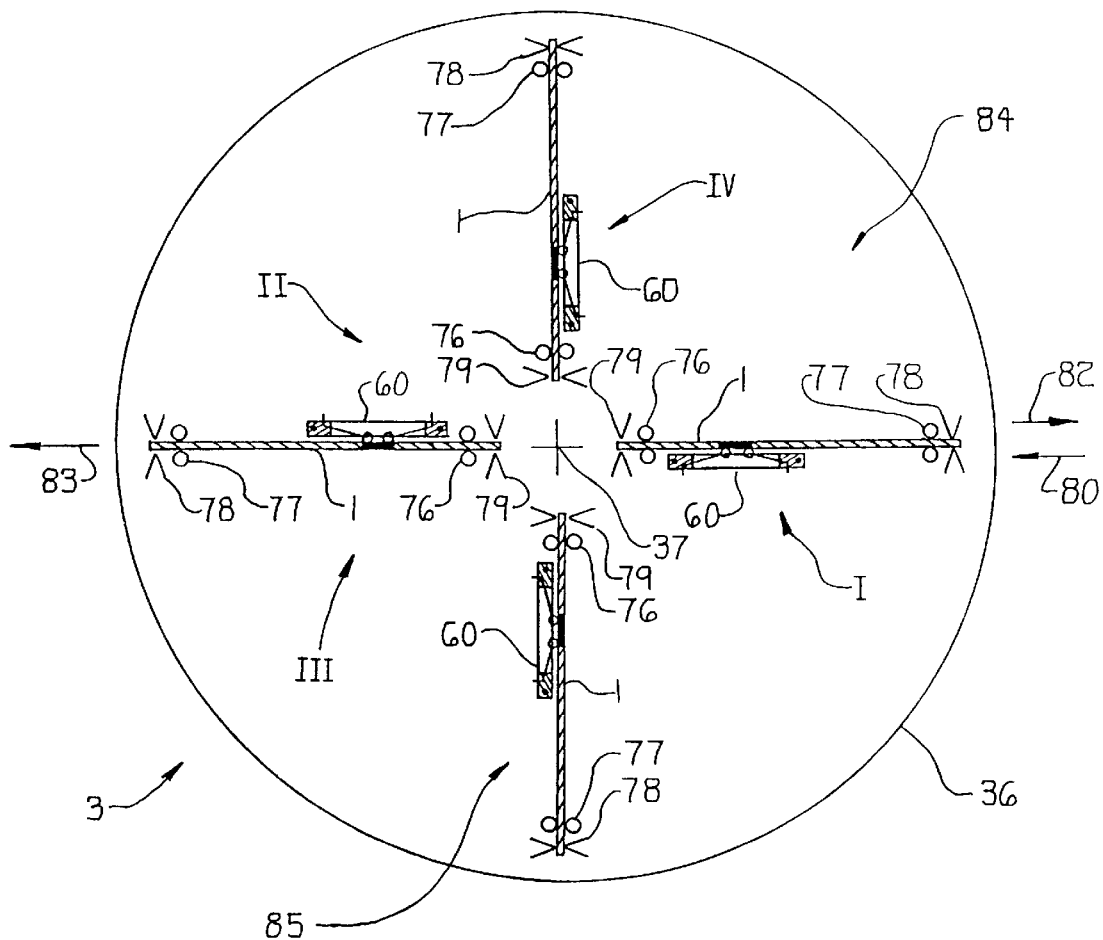
FIG. 5 shows a reversing unit according to FIG. 4 but with four chip contacting devices.

In reversing unit 3 according to FIG. 5, two card transport devices 84, 85 crossing at right angles are provided, each consisting of two portions I and II, III and IV disposed on one and the other side of rotation axis 37 of rotor 36. Each portion I to IV is formed in the same way as portions I and II of card transport device 75 according to FIG. 4. In the reversing unit according to FIG. 5, however, the reversal process takes place in two steps of 90° each. This permits altogether four cards 1 to be loaded simultaneously in rotor 36. So that cards 1 can be moved from one portion I to other portion II of card transport device 84 or from one portion III to other portion I V of card transport device 85, it is necessary that a free space be provided in the area of rotation axis 37 for card transport from portion I to portion II or from portion III to portion IV.

Instead of the described embodiment, the reversing unit shown in FIG. 5 can also be formed so that a card printed on one side is received from the printing unit according to arrow 80 e.g. by first portion I, the reversing unit is then rotated in one direction by 90° or an angle corresponding to the angle between portions I to IV, the next card is received from the printing unit according to arrow 80 by next portion III in this direction of rotation, etc., whereby upon rotation of each card by 360° the reversed card is then supplied to the printing unit again according to arrow 82 for the other side to be printed. During the step-by-step rotation of the reversing unit by 360° the chip of each card is loaded.

Each portion I to IV then has a separately controllable card transport device adapted to move to and fro.

I claim:

1. An apparatus for personalizing identification cards with integrated circuits having at least one printing unit, a reversing unit for reversing and/or transporting a printed card, said reversing unit having a rotor with a rotation axis extending perpendicular to a card transport direction and at least one card transport device fastened to the rotor, and a contacting device for loading the integrated circuits of the cards, wherein the contacting device is disposed on the rotor of the reversing unit.

2. The apparatus of claim 1, wherein the card transport device is formed as a rotating transport device which is controlled to reverse and output the printed card from the reversing unit without a change of its direction of rotation.

3. The apparatus of claim 1, wherein the card transport device is formed to receive at least two successively disposed cards in the card transport direction and the rotor is provided with one of the contacting devices for each of the at least two cards.

4. The apparatus of claim 1, wherein the rotor has at least two of the card transport devices with crossing card transport directions.

5. An apparatus for personalizing identification cards with integrated circuits comprising:
  at least one printing unit for printing the identification card, said printing unit including a card transporting device for transporting the card in a transport direction;
  a reversing unit for transporting and reversing the printed identification card, said reversing unit comprising:
    a rotor with a rotation axis extending perpendicular to the card transport direction;
    card transport rolls secured to said rotor for transporting the printed identification cards; and
    at least one contacting device for loading the integrated circuits onto the printed identification cards, said at least one contacting device disposed on said rotor of said reversing unit for rotation therewith.

6. The apparatus of claim 5, wherein said at least one contacting device comprises two of said contacting devices disposed on said rotor.

7. The apparatus of claim 5, wherein said rotor includes side walls having groove-shaped guides for receiving the printed identification cards, said at least one contacting device positioned adjacent said groove-shaped guides for loading the integrated circuits onto the printed identification cards.

* * * * *